United States Patent
Hall

(10) Patent No.: US 9,932,013 B2
(45) Date of Patent: Apr. 3, 2018

(54) UTILIZATION OF UBIQUITOUS TRANSMITTING DEVICES TO PROVIDE ACCESS CONTROL TO VEHICLES AND /OR OTHER CONTROLLED ACCESS ITEMS/AREAS

(76) Inventor: Christopher J. Hall, Satellite Beach, FL (US)

( * ) Notice: Subject to any disclaimer, the term of this patent is extended or adjusted under 35 U.S.C. 154(b) by 553 days.

(21) Appl. No.: 13/278,128

(22) Filed: Oct. 20, 2011

(65) Prior Publication Data

US 2012/0100806 A1 Apr. 26, 2012

Related U.S. Application Data

(60) Provisional application No. 61/405,190, filed on Oct. 20, 2010.

(51) Int. Cl.
*B60R 25/24* (2013.01)

(52) U.S. Cl.
CPC .................... *B60R 25/24* (2013.01)

(58) Field of Classification Search
CPC ........... G07C 2009/00793; G07C 2009/00952; G07C 2009/00333; G07C 9/00007; B60R 25/24; B60R 25/04; H04W 4/008; H04W 76/025; H04W 88/06; H04W 88/10; H04B 5/02; H04B 1/3822; H04B 1/50; H04B 7/02; H04M 1/7253
USPC .... 455/67.11, 115.3, 161.3, 425, 343, 569.2; 340/425.5, 426.13, 426.2, 426.22
See application file for complete search history.

(56) References Cited

U.S. PATENT DOCUMENTS

| | | | | |
|---|---|---|---|---|
| 6,377,173 | B1 * | 4/2002 | Desai ........................ | 340/426.36 |
| 7,821,383 | B2 * | 10/2010 | Sultan et al. ............ | 340/426.13 |
| 8,245,052 | B2 * | 8/2012 | Bjorn ............................ | 713/186 |
| 8,593,249 | B2 * | 11/2013 | Bliding et al. ................ | 340/5.2 |
| 8,648,693 | B2 | 2/2014 | Tsuruta | |
| 2006/0273887 | A1 * | 12/2006 | Yamamoto .............. | B60R 25/24 |
| | | | | 340/426.36 |
| 2007/0101357 | A1 * | 5/2007 | Duffield ................. | H04N 7/163 |
| | | | | 725/30 |
| 2009/0006846 | A1 | 1/2009 | Rosenblatt | |
| 2009/0136035 | A1 * | 5/2009 | Lee ..................... | G07C 9/00309 |
| | | | | 380/270 |
| 2009/0227282 | A1 * | 9/2009 | Miyabayashi ...... | H04L 63/0492 |
| | | | | 455/552.1 |
| 2009/0237206 | A1 | 9/2009 | Anderson | |
| 2009/0243791 | A1 * | 10/2009 | Partin ................ | G07C 9/00944 |
| | | | | 340/5.2 |

(Continued)

*Primary Examiner* — Andrew Wendell
*Assistant Examiner* — Maryam Soltanzadeh
(74) *Attorney, Agent, or Firm* — John L. DeAngelis; Beusse Wolter Sanks & Maire

(57) ABSTRACT

A first device for use to gain access to a vehicle or to a controlled access item or area, wherein access is controlled by a second device. The first device for carrying on a person of a user and paired with the second device. The first device comprises components having a primary function not related to gaining access; a limited range transmitter for transmitting a signal to the second device, the second device receiving the signal and determining whether the signal was transmitted from the first device; responsive to determining that the signal was transmitted from the first device, the second device for issuing a control signal permitting the user to gain access to the vehicle or to the controlled access item or area.

20 Claims, 2 Drawing Sheets

(56) References Cited

U.S. PATENT DOCUMENTS

| | | | | |
|---|---|---|---|---|
| 2009/0323720 | A1* | 12/2009 | Salokannel | H04W 72/10 370/468 |
| 2011/0029359 | A1* | 2/2011 | Roeding | G06Q 30/00 705/14.1 |
| 2011/0081860 | A1* | 4/2011 | Brown | H04N 1/00347 455/41.3 |
| 2014/0237229 | A1 | 8/2014 | Rosenblatt | |
| 2016/0264098 | A1* | 9/2016 | Joyce-Harris | B60R 25/305 |

* cited by examiner

UTILIZATION OF UBIQUITOUS TRANSMITTING DEVICES TO PROVIDE ACCESS CONTROL TO VEHICLES AND /OR OTHER CONTROLLED ACCESS ITEMS/AREAS

CROSS REFERENCE TO RELATED APPLICATIONS

This patent application claims the benefit of the provisional patent application No. 61/405,190 filed on Oct. 20, 2010 and entitled Utilization of Ubiquitous Transmitting Devices to Provide Access Control to Vehicles.

FIELD OF THE INVENTION

The present invention relates to access control for vehicles and more particularly to the use of transmitting and/or transceiving devices to provide access control for vehicles, and/or other secured areas such as homes, offices, secured computing equipment, ATMs, point of sale terminals, etc.

BACKGROUND OF THE INVENTION

Many new vehicles are available with an electronic RF "key" that need not be removed from the user's pocket, purse, or wallet (and may require no button presses or user manipulation) to unlock, access, start, and/or drive the vehicle. The presence of a control device (herein also called "key" or "key fob", etc.) in proximity to or inside the vehicle (automatically detected by a vehicle system) is all the user needs to open doors, start the motor, etc.

The current art comprises a key fob or similar item that is usually dedicated to a specific vehicle(s) and provides access to that vehicle(s), access controlled area, item, and/or access controlled device. While such a key fob may have other secondary functions, such an LED flashlight, etc., its primary function is that of an access control device. This has proven convenient, and popular, especially when no user manipulation of the device is needed to access the vehicle. However, if a person owns more than one vehicle and the different vehicles use incompatible proprietary systems for providing access, the person must carry more than one key fob to have the functionality for each vehicle. The current embodiment of these key fobs are on the order of half the size of a small cell phone, and inconvenient to carry along with the usual complement of keys and other typical portable electronics devices. Carrying a key fob along with a cell phone in a trouser pocket creates a sizable lump.

BRIEF DESCRIPTION OF THE DRAWINGS

The present invention can be more easily understood and the further advantages and uses thereof more readily apparent, when considered in view of the following detailed description when read in conjunction with the following figures, wherein.

In accordance with common practice, the various described features are not drawn to scale, but are drawn to emphasize specific features relevant to the invention. Reference characters denote like elements throughout the figures and text.

DETAILED DESCRIPTION OF THE INVENTION

Figure 1:
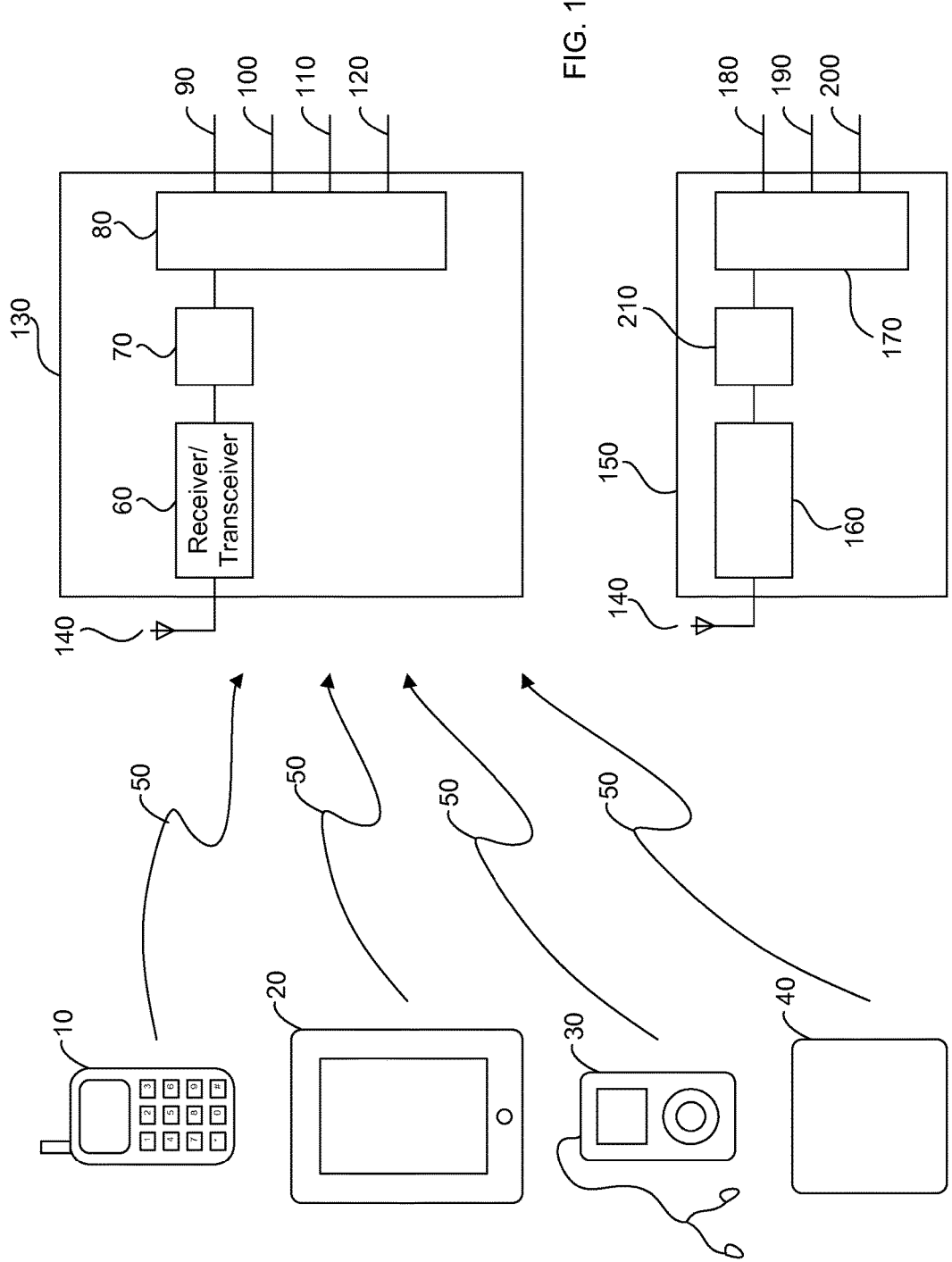
FIG. 1 illustrates components according to embodiments of the present invention.

Before describing in detail the particular methods and apparatuses related to embodiments using transmitting devices and methods related thereto to provide access control to vehicles, controlled access areas and controlled access items, it should be observed that the present invention resides primarily in a novel and non-obvious combination of elements and process steps. So as not to obscure the disclosure with details that will be readily apparent to those skilled in the art, certain conventional elements and steps have been presented with lesser detail, while the drawings and the specification describe in greater detail other elements and steps pertinent to understanding the inventions.

The presented embodiments shall not define limits as to the structures, elements or methods of the inventions, but are provided only as exemplary, non limiting constructions. The embodiments are permissive rather than mandatory and illustrative rather than exhaustive.

While the convenience of a dedicated key fob RF key that need never leave a user's pocket to unlock a car door is undeniable, a smaller, more unified approach is described herein. Many cell phones include a short range wireless (often according to a Bluetooth protocol) interface. Other ubiquitous electronic devices, such as but not limited to, audio players, PDAs, iPODs, iPhones, iPADs, ebook readers, Kindles, laptop computers, pad computers, notebook computers, tablet computers, MPEG players, games, smart phones, etc., may also contain a limited range wireless interface. These devices are often or customarily in possession of a user when he/she wishes to access a vehicle interior or a controlled access item or a controlled access area. Albeit some of the terms listed above are common law or registered trademarks, they tend to be in common use to generically or functionally describe a class of electronic devices. For example, the phrase "Xerox machine" is often used generically to describe a photocopy machine. Thus the list set forth above is not specifically limited to the trademarked products mentioned or their functions. For example, an "iPhone" may be functionally equivalent to an Android phone or other cell phones for the purposes herein of this invention. The number of such devices, and their functionality, is growing rapidly and thus the present application is intended to include within its scope any devices that provide similar functionality or newly or future created functionality whether available today or at a future time. A key point is that such electronic devices are commonly in possession of or on the person of the user at times when he/she also wishes to access a vehicle, home, office, workstation, PC, or other access controlled item or area.

Definitions

For the purposes of this document, the terms "ubiquitous device," "personal electronic device," or "user device" includes, but is not be limited to, the devices described herein, other personal electronic device(s) and other future devices typically carried by a user, other than "key fob", "automotive key fob" or "Xerox machine". The ubiquitous device, personal electronic device or user device means any object or device typically/often carried by a user, possessing a wireless interface whose presence can reasonably be used to infer the presence of the user. (In other words, a device fulfilling but not solely dedicated to fulfilling leg one of an often quoted 'security triad'—leg one being "something you possess" such as a key, ID, keycard, or other device; leg two being "something you know" such as a PIN code or password; and leg three being "who you are" such as a biometric identifier, fingerprint, voiceprint, retina pattern, etc.) For the purposes of this invention, ubiquitous device personal electronic device and/or user device excludes current-art key fobs whose primary function is access control for vehicles and/or garage door openers.

The ubiquitous device may comprise a cell phone, a PDA, an audio player, a video player, a tablet computer, an ebook reader, a laptop computer, a pad computer, a notebook computer, a game player, a smart phone, a penlight, a credit card, a wallet, eyeglasses, a hearing aid, a make-up case, a shoe, a pocket knife and a belt buckle, etc.

"Bluetooth" is herein used as a non limiting example, and may include RF (radio frequency), optical, audio, acoustic, and/or ultrasonic communications formats appropriate to limited range communications, either in current use (examples: Bluetooth, CDMA, EVDO, GSM, LTE, 802.11x, iRDA, etc.), or as developed in the future, including other devices with a non-communication function, but adaptable to the desired functionality, such as (a non-limiting example) the ultrasonic proximity sensors currently used on automobiles and trucks.

"Vehicle," "car", "truck", "automobile," "house," "office", "workstation", "door", "item being accessed", "controlled access item," "controlled access area", and words and phrases of similar import are, for the functions envisioned herein, used interchangeably to include any item, area or device for which access and/or use is controlled and that grants access and/or use by unlocking/relocking in response to the presence or non-presence of a user-possessed device.

Typically, according to an embodiment of the invention, access to the vehicle, the controlled access area or the controlled access item is controlled by a locking/unlocking device that controls access. Upon unlocking or releasing the locking/unlocking device, access is gained to the vehicle, controlled access area or controlled access item. An embodiment of the present invention teaches unlocking or releasing the locking/unlocking device in response to a signal transmitted from any one of the ubiquitous devices that are commonly carried on a person.

In one embodiment the ubiquitous device transmits a signal that is received by an existing Bluetooth device within a vehicle. Thus the teachings of the present invention can be applied to an existing vehicle with an integral Bluetooth system. This integration may be possible by modifying the software/firmware of the existing Bluetooth system, but in this embodiment it is not generally necessary to modify existing hardware components of the Bluetooth system.

Advantageously, the transmission to unlock the vehicle, controlled access area or controlled access item occurs without user action when the user is within a limited range of the locked vehicle, controlled access area or controlled access item. This passive interaction occurs without any intervention or manipulation by the user. Generally, the limited range may be on the order of about 10 meters. Obviously the user does not want the vehicle, controlled access area or controlled access item to be unlocked when he/she is at a substantial distance.

Bluetooth system, as a non-limiting example, have a 12 hexadecimal digit 'device address', and are capable of being 'paired' to recognize and log into each other as they come into range of each other. Further authentication, including but not limited to password protection and encryption, is possible and may be utilized. (Similarly, other devices such as cell phones have unique identifiers, for example known as MIN, ESN, IMSI, TMSI, MAC addresses, etc. depending upon applicable protocol definitions, and some devices have unique manufacturer defined identifiers or serial numbers that can be accessed and used as a unique identifier for the device. Further, programmable devices may allow a unique identifier to be created/assigned by the user.) The presence of the user's ubiquitous device in proximity to the vehicle, item or area being accessed may be used for a two-way handshake and/or authentication (including but not limited to encrypted exchanges), or a one-way message may be used from the user device (i.e., in the possession of the user).

As is known by those skilled in the art, a Bluetooth device may remain in an "on" configuration while drawing only a small amount of current from a battery source. Thus such a device may be preferred for use with the present invention as it can remain "on" for extended periods and allow access to a vehicle, a controlled access item or a controlled access area.

As a non-limiting example, a device in possession of the user may emit an intermittent or continuous message, possibly including a unique, time-varying code, to broadcast its presence for receiving by the locking/unlocking device that controls access to the vehicle, the controlled access item or the controlled access area. The time-varying code may be used to prevent the prior recording of a fixed code and its subsequent playback. Such fixed codes were used on early garage door openers, which could be opened by a recorded and replayed transmission.

If a two way handshake and/or one way message is used, it may be noncompliant with the promulgated standard for which the user device was originally designed. For instance, a Bluetooth user device may emit a message that is frequency and/or modulation compatible with its transmitter, and similar to, but with a message format or certain fields within the message that are not compliant with the Bluetooth standard.

The Bluetooth message is received by a device that can receive and recognize a standard or nonstandard message as evidence of the user's presence. As an example, portions of an otherwise normally structured Bluetooth message may be sent, with redefined or invalid substitutions for fields within the message. Such changes may be made in software/firmware only, in some devices. The use of nonstandard messages may enhance security and/or (marketing) exclusivity, rendering the messages 'invisible' to devices not specifically designed and/or programmed to recognize them. Such non standard messages may be necessary for use with present/future protocols that do not automatically search for the presence of another (such as Bluetooth "paired") device. Noncompliant messaging may also include such things as transmissions out of the normally-utilized RF band (but within the hardware device capabilities), nonstandard channels within a standardized band, or with such things as different pulse rates of optical devices, etc. Further, to reduce battery consumption in the user device, relatively frequent or continuous transmissions not envisioned in the standardized protocol may be needed from the vehicle or other access controlled device, to trigger the user device transmission and or handshake in response. User devices transmitting continuously may adversely impact battery life, while a vehicle, for instance can typically allow a few milliamps to be used continuously for a transmission.

Another example of noncompliant messaging may include periodic activation of a cell phone's main transmitter at a sufficiently low power level that the range is quite limited, to identify its presence in proximity to the item being accessed. Yet another example of a non compliant message is a message that is transmitted outside the assigned frequency band, but within the bandwidth of a receiver. The out-of-band message is interpreted to provide access to the vehicle, controlled access area or the controlled access item.

According to one embodiment of this invention, the Bluetooth capability in a portable electronic device acts as a 'key' to a vehicle, door (e.g., entry door to a structure) or other access control devices, including signing onto a computer workstation or another computer. As an example, when one approaches his/her vehicle, the cell phone in his/her purse/pocket reestablishes its Bluetooth connection (one way or two way) with the vehicle, optionally exchanges further authentication information, and establishes his/her presence in proximity to the vehicle as effectively as a proprietary key fob.

Note that current equipment in some vehicles establishes a "paired" connection to cell phones in order to use the vehicle's integrated speakerphone function through a personal cell phone or reestablishes the connection to such things as portable music players for entertainment. Thus, all necessary transceiver hardware already exists in many vehicles.

The gist of one embodiment of the current invention utilizes a ubiquitous device/object and/or common personal electronic device, often, normally, typically, or customarily carried by the user, for example a cell phone or a PDA, for accessing a vehicle or other access controlled location/item, instead of a proprietary key fob or other transceiver that is primarily dedicated to the function.

Bluetooth is the current protocol believed likely to be most useful for this purpose, as it intrinsically has a limited range. One does not want his/her vehicle to unlock when he/she is still 100 yards away. IEEE 802.11x protocol devices, other RF and/or optical or acoustic protocols like iRDA may be used instead, or newly developed protocols that may become popular.

Longer range protocols like 802.11x devices may need to use signal strength, round trip propagation time, or other signal metric(s) as additional criteria(ion) to permit access. The signal strength or other metric, as determined at the personal electronic device and/or the transceiver hardware within the vehicle, must indicate that the personal electronic device and the vehicle or other access controlled item are within a desired proximity to provide access to use of the vehicle, item, and/or its functions. For instance, one would not want an 802.11x capable device (sometimes having ranges of a hundred meters or more) to inadvertently unlock a vehicle parked outside in the driveway.

This access control approach may also be used for door locks on homes, offices, other secured areas and/or electronic access control to computer or other systems, including laptops, ATMs, vending machines, credit 'swipers' and other devices where proximity of a user's personal electronic device can be used as a primary or a supplementary identification and/or access control. Such devices/areas may be referred to herein as controlled access items or controlled access areas.

To provide valet parking access or similarly limited access to vehicles or other items, a simple Bluetooth key fob-style or other small device can substitute for the user's ubiquitous electronic device. That is, it is not necessary for the owner to leave his/her cell phone, music player, or other device with the parking attendant. Proprietary key fobs can also be used to fulfill this function. However, some disabling mechanism (including but not limited to a simple power switch) may be necessary to prevent a valet access device, kept somewhere in the vehicle, from keeping the vehicle unlocked and ready to be started because of its proximity. Valet access devices may also be limiting in other ways, such as lacking the capability to exceed a certain vehicle speed/power, not having the capability to unlock the trunk, etc.

Different user-owned ubiquitous electronic devices may include such access/use limitations (i.e., providing access to the vehicle, controlled access area or controlled access item but limiting operation to predetermined functions thereof). As a non-limiting example, the vehicle may fully unlock and respond to the owner's cell phone, but it may not unlock the trunk or permit driving above 55 MPH from the son's music player or cell phone. This identity data (as derived from the specific ubiquitous device that provides the unlocking functions) can also be utilized to enable/disable such things as GPS position reports to determine where the vehicle is, repositioning seats, brake pedals, mirrors, etc. to the driver preference, etc.

If more than one device is present, access can be determined based upon the access limitations set for the devices present. For example, the owner, driving with his cell phone and son's music player both present in the car, could still be permitted to drive over 55 MPH and open the trunk, though his son's music player does not permit such access.

This feature can be implemented, for example, based on an electronic serial number or another identifier transmitted from the ubiquitous device that is providing the unlocking/access function.

In an embodiment for higher security applications, more than one ubiquitous device or leg of the triad may be required. As a non-limiting example, a user may require that both his cell phone and PDA must be present to access his car/home/or other secure item. Alternatively, the user may require the use of one ubiquitous device plus the entry of a password, numeric and/or biometric information. Detection of the presence of the ubiquitous device may also disarm an alarm on a vehicle or home in addition to providing entry.

In another embodiment, the smartphone, PDA, or another ubiquitous electronic devices can be loaded with software that supplies an access menu, duplicating the 'lock', 'unlock', 'open trunk', 'panic button' or other functions currently associated with a proprietary key fob. Some user devices also have 'hotkeys' that can be pressed without actually opening the phone or fully activating the user device, which could be used for such functions.

Bluetooth or other transceivers in user devices that are, or could be redesigned to be, frequency/modulation compatible may be used to emulate proprietary 'keyfob' protocols for specific vehicle manufacturers. A manufacturer of a personal electronic device may need to license a proprietary protocol associated with a specific vehicle to replicate the function of the key fob associated with that vehicle, as well as license this patent.

Nothing in this application/invention is limited to Bluetooth use alone, as this general approach may be utilized with whatever communications protocols that are available in personal electronic devices at this time or future times.

Note too that cell phones are currently being considered as access/payment devices for vending machines, etc. However, these applications typically require the user to actually perform a calling/dialing function or other manipulation of the phone, which turns on the longer range cellular/trunking/PCS, or similar transmitter. In this invention, such an approach could be used, but it is considered far more convenient if no user manipulation is required, and no activation of the primary, higher powered transmitter (with its possible interference/congestion impact to the cellular network) is needed. However, use for point of sale, ATM, or similar devices might logically include use of a PIN or biometric identifier at the point of sale device to prevent the possibility that, for instance, the person in front of you in line isn't using your account simply by your user device being present In another embodiment a proprietary transceiver, such as those present in present art key fobs, is added to a ubiquitous personal device. For example, a proprietary transceiver could be added to one or more phone models to interact with a particular vehicle type or other access device. That is, as a non limiting example, car manufacturer X may allow its proprietary transmitters/transceivers to be featured in a line of phones manufactured by Company Y, perhaps through a licensing and/or marketing agreement.

According to another embodiment the proprietary transceiver is an add-on or add-in component to various ubiquitous electronic devices, for example as a plug in item (as an example, similar in size to a memory chip or SIM card, or integrated into a working plug-in item such as the SD or microSD memory that is current art in various phones and other devices), or by replacing a standard part(s). A non limiting example incorporates the proprietary transceiver into a battery pack (or battery cover) for certain phones or other devices. Thus, the user replaces the standard battery pack (in, for instance, a cell phone) with one containing the proprietary transceiver to enable the device to be used for access purposes. This might include minor modifications, such a replacing the battery cover/door with one that allows space for both the battery and the added transceiver. A further advantage would be that if placed into or attached to a battery, the proprietary transceiver would have access to power even if the device it resides in is turned completely off. That is to say, a turned-off phone will still access the user's vehicle or other item. The proprietary transceiver could also be designed to work at a lower voltage than the device it resides in, or with its own small battery, so, as an example, even though the phone (or other device) it resides in has shut down due to low battery or been manually turned off, the proprietary transceiver continues to function, allowing the user to access his vehicle and/or computer, home, etc.

Note that for the described applications a 'proprietary transceiver' could include a Bluetooth or other promulgated protocol device as described elsewhere in this document or as known by those skilled in the art.

In another embodiment, a 'proprietary transceiver' (including non proprietary protocols such as Bluetooth) could be added and used for access purposes to an object or device which does not normally incorporate a transceiver. In fact, such a transceiver and battery could be added to other ubiquitous objects typically carried by the user (besides a key fob), such as a flashlight, penlight, credit card, wallet, eyeglasses, hearing aid, compact, shoe, pocket knife, belt buckle, etc. limited only by the creativity of the marketer. This provides the same functionality as a key fob without adding another item to the complement of items that the user would otherwise carry, and could disguise the access device (perhaps as a theft deterrent).

Certain of the presented embodiments refer to the use of the Bluetooth protocol for linking a controlling device carried on a person to a controlled access item, such as a vehicle. However, the present invention can employ any wireless protocol for linking these devices, including but not limited to, any optical, acoustic, radio frequency, infrared, ultraviolet, magnetic field or electromagnetic protocol suitable for short range use. For instance, such a system could be designed to interact with the ultrasonic transceivers frequently used as backup proximity alerts or for automatic parking in current vehicles.

Remote vehicle starters, door locks/unlocks, alarm systems, etc. are often offered as aftermarket devices. This raises cost, as hardware duplication is often needed. A preferred embodiment of the current invention utilizes existing hardware within a vehicle, computing device, etc.—such as built-in Bluetooth or cellular transmitters/transceivers, which may already be interfaced with onboard data busses/networks to provide the functionality with minor, relatively low cost changes to already incorporated hardware, firmware, and/or software.

As a non-limiting example, current Lexus™ vehicles have Bluetooth speakerphones integrated with the existing vehicle data busses, stereo systems, which may be able to provide the communications functions needed for the current invention, with no additional hardware cost. Another example is the GM vehicles equipped with OnStar™ whose cellular equipment interfaces with engine computers, GPS, door locks, etc. and utilizes integrated, onboard networking to aid these functions. Such vehicles may benefit from an integrated solution.

Similarly, computing devices, alarm systems, and other access controlled items/areas may already include wireless interfaces that can be utilized with minor hardware/software/firmware changes to provide for the envisioned functionality. In other words, utilization of existing hardware is a preferred embodiment.

FIG. 1 illustrates elements of the present invention. One or more of a cell phone 10, a PDA 20, an MP3 player 30, or other user devices represented by a device 40, communicate over a wireless link 50 with a locking/unlocking device 130 that controls access to a vehicle, a controlled access area or a controlled access item. A signal from the cell phone 10, the PDA 20, the MP3player 30 or the device 40 is received at an transducer 140. The transducer 140 comprises a transducer for receiving the limited range signal, such as RF signal, an optical signal, an acoustic signal, an infrared signal, an ultraviolet signal or for sensing a magnetic field. A signal from the transducer 140 is input to a receiver/transceiver 60.

An interface unit 70 receives an input signal from the receiver/transceiver 60 and supplies a control signal to a vehicle element 80, using a vehicle as an example. The vehicle element 80 may comprise, for example, control electronics devices, busses, security functions, a speakerphone, etc.

Various control interfaces extend from the vehicle element 80, such as a door lock control line 90, an annunciator 100, and other control interfaces 110 and 120 connected to other controlled and controlling elements of the vehicle.

In an application for controlling access to a controlled access item or a controlled access area, a signal from the cell phone 10, the PDA 20, the MP3 player 30 or the device 40 is received at the transducer 140 of the non-vehicle controlled access item 150. The transducer 140 is capable of receiving or trans-receiving an RF signal, an optical signal, an acoustic signal, an infrared signal, an ultraviolet signal or for sensing a magnetic field.

A signal from the transducer 140 is input/output to a receiver/transceiver 160.

An interface unit 210 receives an input signal from the receiver/transceiver 160 and supplies a control signal to a control element 170, which may be an existing component of the controlled access item or area, or may be an add-on component necessary for controlling access to the controlled access item or area according to the teachings of the present invention.

Various control lines 180, 190 and 200 extend from the control element 170. A control signal on one or more of these control lines provides user access to the controlled access item or the controlled access area.

Figure 2:
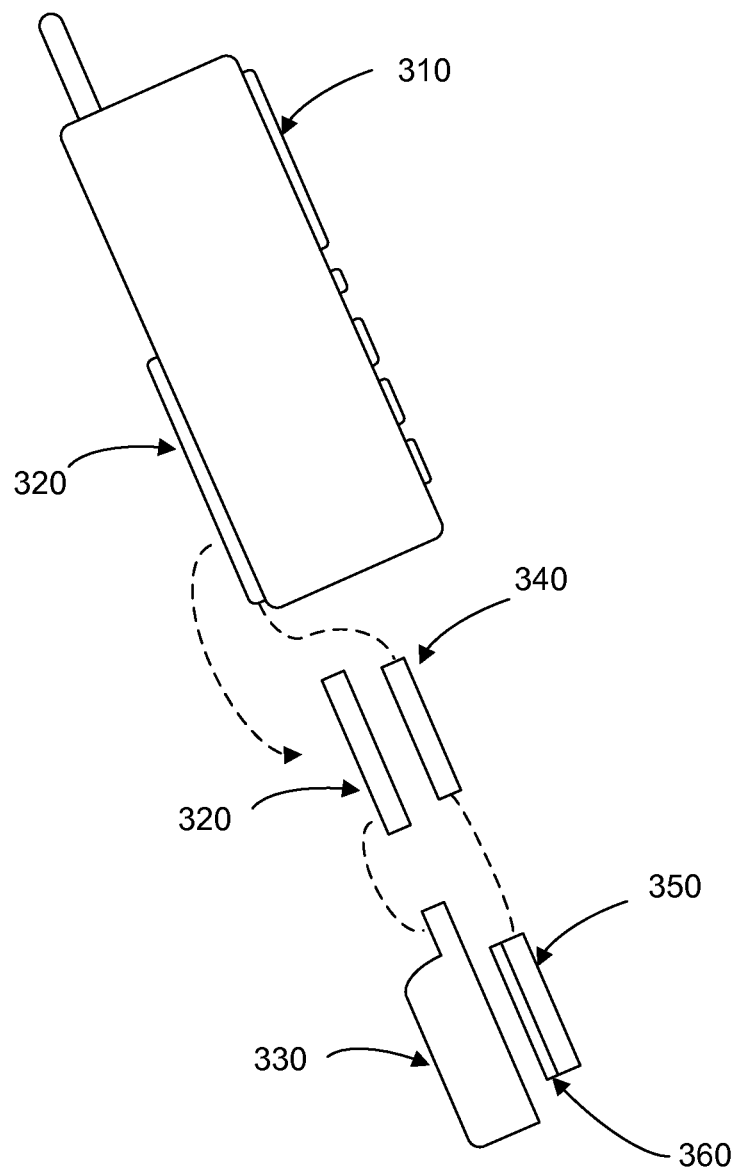
FIG. 2 illustrates a cell phone as an example of a device that can be modified according to the present invention.

FIG. 2 illustrates a side view of an existing transmitting device 310, such as a cell phone. A battery door 320 is disposed on a rear surface of the device 310 for closing a battery compartment that carries a battery 340 (shown removed from the battery compartment). In one embodiment, the battery door 320 is replaced by a battery door 330 having a wider profile that can accommodate a transmitter/receiver 350 (Bluetooth for example) attached to a battery 360, that may have a greater capacity than the battery 340. Alternatively, the transmitter/receiver 350 may be placed on an inside or outside surface of the battery door 320 or the battery door 330 (these latter configurations not shown in FIG. 2).

Although the presented embodiments have been shown and described with respect to a certain preferred embodiments, it is obvious that equivalent alterations and modifications will occur to others skilled in the art upon the reading and understanding this specification and the annexed drawing. In particular regard to the various functions performed by the above described components (assemblies, devices, circuits, etc.), the terms used to describe such components are intended to correspond, unless otherwise indicated, to any component that performs the specified function of the described component (i.e., that is functionally equivalent), even though not structurally equivalent to the disclosed structure that performs the function in the described embodiment. In addition, while a particular feature of the invention may have been disclosed with respect to only one of several embodiments, such feature may be combined with one or more other features of the other embodiments as may be desired and advantageous for any given or particular application.

What is clamed is:

1. A first device for use to gain access to a vehicle or to a controlled access item or area, wherein access is controlled by a second device, the first device for carrying on a person of a user, the first device paired with the second device, the first device comprising:
    first components for transmitting or transceiving first communications signals, the first communications signals not related to gaining access;
    second components for transmitting or transceiving a second communications signal without user action, related to gaining access, and intended for receiving by the second device, the second communications signal having a lower power and thus a shorter range than the first communications signals; the second device receiving the second communications signal and determining whether the second communications signal was transmitted from the first device based on parameters of the second communications signal;
    the first communications signals carrying different information than the second communications signal; and
    responsive to determining that the second communications signal was transmitted from the first device, the second device for issuing a control signal permitting the user to gain access to the vehicle or to the controlled access item or area; in implementations wherein a transceiver is added to the first device specifically for the purpose of gaining access to the vehicle or to the controlled access item or area, replacing a battery cover/door to add the transceiver with the battery, the added transceiver is attached to the battery and is functional even if the first device is turned off.

2. The first device of claim 1 wherein predetermined functions of the second device are made operational responsive to characteristics of or data carried by the second communications signal.

3. The first device of claim 1 wherein the second device controls access to a plurality of controlled access items and the second communications signal includes information used by the second device to determine which one of the plurality of controlled access items the user can access.

4. The first device of claim 1 wherein the second communications signal comprises one or more of an RF signal, an optical signal, an acoustic signal, an infrared signal, an ultraviolet signal, and a magnetic field.

5. The first device of claim 1 wherein a function of the first components comprises one or more of a cell phone, a PDA, an audio player, a video player, a tablet computer, an eBook reader, a laptop computer, a pad computer, a notebook computer, a game player, a smart phone, a penlight, a credit card, a wallet, eyeglasses, a hearing aid, a make-up case, a shoe, a pocket knife and a belt buckle.

6. The first device of claim 1 wherein the second components comprise one of a Bluetooth transmitter, a Bluetooth transceiver, a radio frequency transmitter, a radio frequency transceiver, an optical transmitter, an optical transceiver, an acoustic transmitter, an acoustic transceiver, an ultrasonic transmitter, an ultrasonic transceiver, and a magnetic field generator.

7. The first device of claim 1 wherein the first device supplies to the second device a password assigned to the user, and wherein the second device determines whether the user is an authorized user responsive to the password, the authorized user permitted to gain access to the vehicle or to the controlled access item or area.

8. The first device of claim 1 wherein the second communications signal is encrypted according to an encryption scheme known to the first and second devices.

9. The first device of claim 1 wherein the first and second devices conduct a two-way handshake for use in determining whether the second communications signal was transmitted from the first device.

10. The first device of claim 1 wherein the second communications signal includes a non-compliant code relative to a protocol used by the first and second devices, and wherein the second device recognizes the non-compliant code for use in determining whether the second communications signal was transmitted from the first device.

11. The first device of claim 1 wherein the second communications signal comprises a time-varying code, and wherein the second device recognizes the time-varying code for use in determining whether the second communications signal was transmitted from the first device.

12. The first device of claim 1 wherein the second device determines a signal strength of the second communications signal for use in determining whether the second communications signal was transmitted from the first device or an approximate transmission range.

13. The first device of claim 1 wherein the second components transmit the second communications signal not in response to a signal from the second device, but responsive to one of a user-entered request and periodically or intermittently without any user interaction.

14. The first device of claim 1 wherein the second device determines the second communications signal was transmitted from the first device responsive to signal energy outside a predetermined frequency band.

15. The first device of claim 1 wherein the controlled access area or the controlled access item comprises one of a home, office, workstation, computer, ATM, vending machine, credit card swiper.

16. A first transmitting device for controlling a second device, the second device controlling access to a vehicle or to a controlled access item or area, or permitting operation of a third device, the first transmitting device comprising:
a first component for physically mating the first transmitting device to a radio frequency transmitting device, the radio frequency transmitting device for carrying on a person of a user and not for transmitting signals for gaining access or permitting operation;
a transmitter for transmitting a signal;
the second device paired with the first transmitting device for receiving the signal and for determining whether the signal was sent from the first transmitting device; and
responsive to a determination that the signal was transmitted from the first transmitting device, the second device allowing the user to gain access to the vehicle or to the controlled access area or to operate the third device; in implementations wherein a transceiver is added to the first device specifically for the purpose of gaining access to the vehicle or to the controlled access item or area, replacing a battery cover/door to add the transceiver with the battery, the added transceiver is attached to the battery and is functional even if the first device is turned off.

17. The first device of claim 16 wherein predetermined functions of the second device are made operational responsive to characteristics of the signal.

18. The first device of claim 16 wherein one or more of the following are used for determining whether the signal was transmitted from the first device, a password transmitted in the signal, a signal strength of the signal, an encryption scheme of the signal, a non-compliant code message code, signal energy outside a normally-utilized RF band of the signal, and a time-varying code within the signal.

19. The first device of claim 16 wherein the signal comprises one of an RF signal, an optical signal, an acoustic signal, an infrared signal, an ultraviolet signal, and a magnetic field and wherein the second component comprises a battery pack.

20. The first device of claim 16 wherein the radio frequency transmitting device comprises a cell phone, a PDA, a tablet computer, an eBook reader, a laptop computer, a pad computer, a notebook computer, a game player, and a smart phone.

* * * * *